(12) United States Patent
Truong et al.

(10) Patent No.: US 7,843,829 B1
(45) Date of Patent: Nov. 30, 2010

(54) DETECTION AND RECOVERY FROM CONTROL PLANE CONGESTION AND FAULTS

(75) Inventors: Alex Van Truong, San Jose, CA (US); Ming Li, Cupertino, CA (US); Jerry B. Scott, Los Altos, CA (US); Sanjeev N. Chhabria, Castro Valley, CA (US); Bhaskar Bhar, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 1202 days.

(21) Appl. No.: 10/915,779

(22) Filed: Aug. 10, 2004

(51) Int. Cl.
*H04L 12/26* (2006.01)
*H04L 12/56* (2006.01)

(52) U.S. Cl. ...................... 370/235; 370/412
(58) Field of Classification Search ............... 370/230, 370/232, 235, 236, 229, 412, 429, 413, 428, 370/236.1, 236.2, 241, 241.1, 252, 244, 389, 370/392; 379/229; 710/52, 57; 709/230, 709/232, 235
See application file for complete search history.

(56) References Cited

U.S. PATENT DOCUMENTS

| | | | |
|---|---|---|---|
| 6,771,601 B1 * | 8/2004 | Aydemir et al. | 370/231 |
| 6,996,225 B1 * | 2/2006 | Bordonaro et al. | 379/229 |
| 7,190,669 B2 * | 3/2007 | Banerjee | 370/229 |
| 7,327,680 B1 * | 2/2008 | Kloth | 370/235 |
| 7,724,665 B2 * | 5/2010 | Tanaka | 370/235 |

FOREIGN PATENT DOCUMENTS

EP 1249972 A1 * 10/2002

\* cited by examiner

*Primary Examiner*—Aung S Moe
*Assistant Examiner*—Feben Haile
(74) *Attorney, Agent, or Firm*—Stolowitz Ford Cowger LLP

(57) ABSTRACT

One embodiment in accordance with the invention is a method. For example, the method can include receiving a plurality of control plane messages. A determination can be made as to whether a processor card of a router is experiencing sustained congestion from the plurality of control plane messages. Provided the processor card is experiencing sustained congestion, a source of the sustained congestion can be identified. A correction phase can be entered in order to respond to the source of the sustained congestion.

29 Claims, 6 Drawing Sheets

DETECTION AND RECOVERY FROM CONTROL PLANE CONGESTION AND FAULTS

BACKGROUND

Some computer networking environments can include routers and switches that forward data and information between different computers and networks. Specifically, within a network router or an Asynchronous Transfer Mode (ATM) switch there are typically many control channels which are used for signaling, routing, along with interprocess communication (IPC). Usually, these control plane messages are exchanged between multiple application sources from multiple line cards to a common destination such as the active control card or processor card. These multiple application sources commonly exchange control plane messages over different control channels destined towards the control card (or processor card). Typically, the control plane messages arriving from these different control channels are stored in a common arrival queue (or several priority-based queues) of the control card. As such, these messages are subsequently drained from the queue (or queues) by dispatching them to the appropriate control applications.

However, there are disadvantages associated with this control plane queuing technique. For example, in the case where multiple source channels are funneled to a common destination queue of the control card (or processor card), and there is message congestion caused by a defective source, the other sources utilizing that queue can be adversely affected. Note that a message overflow condition can be caused by various reasons, including faults such as a misconfiguration of a signaling source; a malfunctioning application that is over congesting the control channel; a corrupt or defective hardware source; and the like.

Currently, one of the conventional techniques for trying to resolve this issue is to throttle (or restrict) the source such that it does not overload the destination. However, this conventional technique does not scale well from the software side of the router or switch. For example, multiple source applications sharing a common IPC pipe are to somehow throttle themselves independently in an efficient way such that bandwidth is not wasted.

Another conventional technique is to modify the receiving hardware of the active control card (or processor card). For example, the receiving hardware can be modified to support some type of per source per channel traffic queuing and shaping to ensure that traffic overflow from one source does not affect other sources. However, this solution is typically very expensive, and again does not scale well to address this problem. For example, given five source channels per card and 30 slots in a router or switch, that results in 150 queues just for platform control traffic. In reality, there are usually a limited number of input queues that can be used to service control traffic.

The invention may address one or more of the above issues.

SUMMARY

One embodiment in accordance with the invention is a method. For example, the method can include receiving a plurality of control plane messages. A determination can be made as to whether a processor card of a router is experiencing sustained congestion from the plurality of control plane messages. Provided the processor card is experiencing sustained congestion, a source of the sustained congestion can be identified. A correction phase can be entered in order to respond to the source of the sustained congestion.

In another embodiment, the invention provides a system. For example, the system can include a line card that includes a source for outputting a plurality of control plane messages. A processor card can be coupled with the line card and can receive the plurality of control plane messages. Additionally, the processor can determine if the it is experiencing sustained congestion. The processor can also identify the source of the sustained congestion.

In yet another embodiment, the invention provides an electronic device readable medium having readable code embodied therein for causing a system to perform a method. The method can include receiving a plurality of control plane messages. A determination can be made as to whether a processor card of a router is experiencing sustained congestion from the plurality of control plane messages. Provided the processor card is experiencing the sustained congestion, a source of the sustained congestion can be identified. A correction phase can be entered in order to respond to the source of the sustained congestion.

In still another embodiment, the invention provides a system. For example, the system can include means for receiving a plurality of control plane messages. The system also can include means for determining if a processor card is experiencing sustained congestion from the plurality of control plane messages. Additionally, the system can include means for identifying a source of the sustained congestion. Moreover, the system can include means for entering a correction phase in order to respond to the source of the sustained congestion.

While particular embodiments of the invention have been specifically described within this summary, it is noted that the invention is not limited to these embodiment. The invention is intended to cover alternatives, modifications and equivalents which may be included within the scope of the invention as defined by the Claims.

DETAILED DESCRIPTION

Reference will now be made in detail to embodiments in accordance with the invention, examples of which are illustrated in the accompanying drawings. While the invention will be described in conjunction with embodiments, it will be understood that these embodiments are not intended to limit the invention. On the contrary, the invention is intended to cover alternatives, modifications and equivalents, which may be included within the scope of the invention as defined by the appended claims. Furthermore, in the following detailed description of embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions, which follow, are presented in terms of procedures, logic blocks, processing, and other symbolic representations of operations on data bits within a computing system or digital system memory. These descriptions and representations are the means used by those skilled in the art to most effectively convey the substance of their work to others skilled in the art. A procedure, logic block, process, etc., is herein, and generally, conceived to be a self-consistent sequence of operations or instructions leading to a desired result. The operations may involve physical manipulations of physical quantities. Usually, though not necessarily, these physical manipulations take the form of electrical or magnetic signals capable of being stored, transferred, combined, compared, and otherwise manipulated in a computing system or similar electronic computing device.

Unless specifically stated otherwise as apparent from the following discussions, it is understood that throughout discussions of the present invention, discussions utilizing terms such as "tracking", "storing", "determining", "transmitting", "outputting", "receiving", "generating", "creating", "utilizing", "enabling", "collecting", "identifying", "directing", "alerting", "alarming", "shutting down" or the like, can refer to the action and processes of a computing system, or similar electronic computing device, that manipulates and transforms data. The data can be represented as physical (electronic) quantities within the computing system's registers and memories and can be transformed into other data similarly represented as physical quantities within the computing system's memories or registers or other such information storage, transmission, or display devices.

Figure 1:
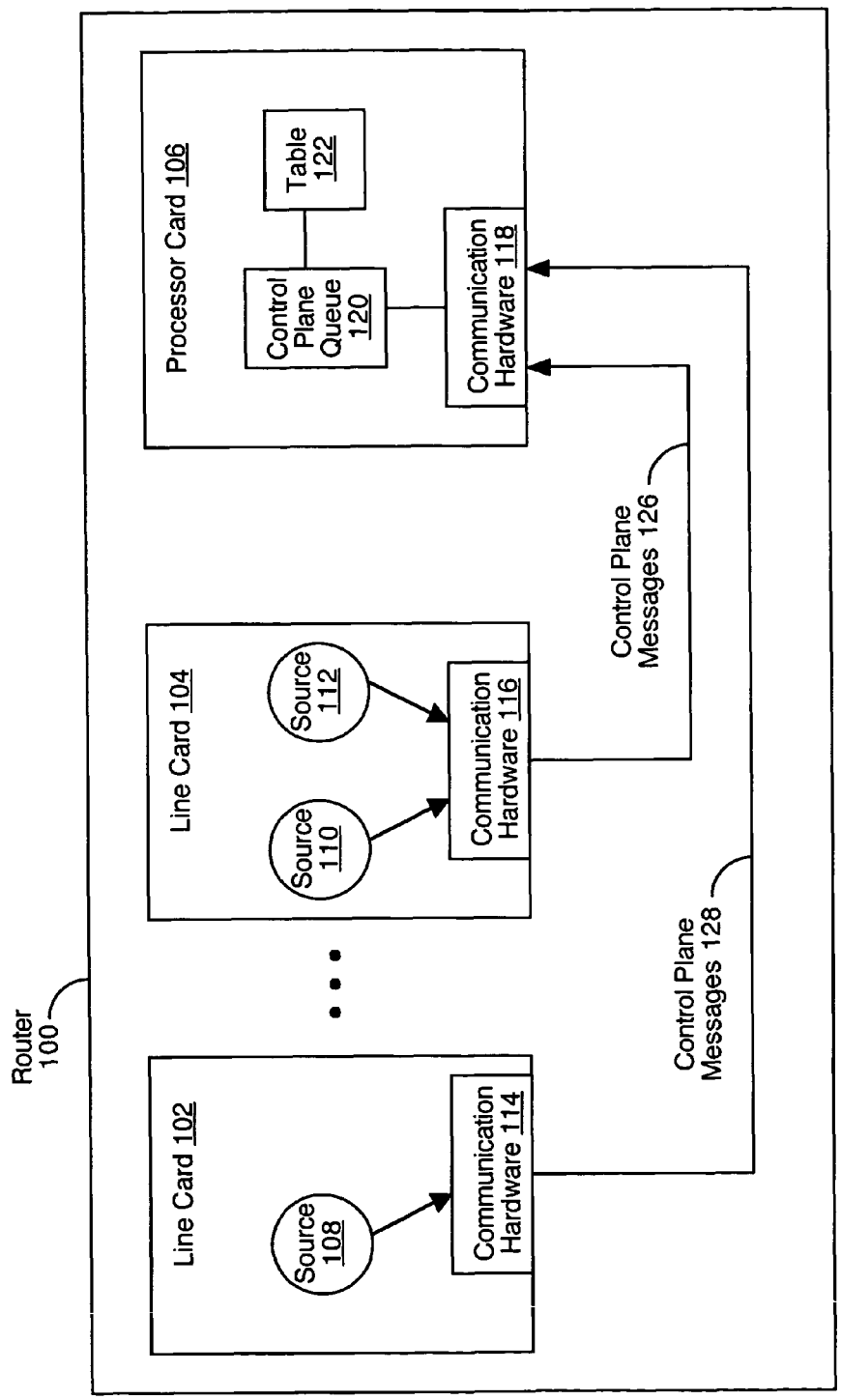
FIG. 1 is a block diagram of an exemplary network router (or switch) in accordance with embodiments of the invention.

FIG. 1 is a block diagram of an exemplary network router (or switch) 100 in accordance with embodiments of the invention. Within network router 100, control channels can be are used for, but not limited to, signaling, routing, interprocess communication (IPC), and the like. As such, control plane messages (e.g., 126 and 128) can be exchanged between multiple application sources (e.g., 108, 110, and 112) from one or more line cards (e.g., 102 and/or 104), route processor cards, and/or electronic hardware modules that access the control plane to a common destination such as a processor card or active control card (e.g., 106). The multiple application sources can exchange control plane messages (e.g., 126 and 128) over different control channels destined towards processor card 106. The control plane messages (e.g., 126 and 128) arriving from these different control channels can be stored in a common arrival queue 120 (or several priority-based queues) of the processor card 106. Subsequently, control plane messages 126 and 128 can be drained from the queue (or queues) 120 by dispatching them to the appropriate control applications.

Within network router 100, a determination can be made as to whether processor card 106 is experiencing sustained congestion caused by receiving control plane messages (e.g., 126 and 128) from multiple application sources (e.g., 108, 110, and 112) resident to one or more electronic hardware modules (e.g., line cards 102 and/or 104). This sustained congestion determination can be continually repeated until determined in the affirmative. When the processor card 106 is experiencing sustained congestion, message headers can be extracted from the messages that are resident to queue 120 and be stored within a table (or list or data store) 122. Note that each message header can include a unique identification (ID) corresponding to the application source (e.g., 108, 110, or 112) that output it. The source ID contained by the message headers can be utilized to determine the potential source (or sources) of the control plane congestion. Once the potential control plane source (or sources) is identified, a correction phase (or mode) can be entered in order to respond to the control plane congestion of queue 120. For example, the correction phase can include, but is not limited to, alerting and/or shutdown one or more control plane flooding sources (e.g., 108, 110, and/or 112). In this manner, network router 100 can include a flexible way to categorize, alert, and shutdown one or more control plane flooding sources (e.g., 108, 110, and/or 112) that may otherwise cripple router 100 if not shutdown.

Within FIG. 1, it is appreciated that within router 100, message congestion (or message overflow) can be caused in a wide variety of ways. For example, message congestion can be caused by, but is not limited to, misconfiguration of a signaling source (e.g., 108, 110, or 112), a malfunctioning application (e.g., 108, 110, or 112) that is over congesting a control channel, a corrupt or defective hardware source (e.g., 108, 110, or 112), and the like. Additionally, congestion may be defined as a certain number of messages that arrive at a rate that crosses a defined threshold. Assuming that source 112 has become defective and begins causing message congestion at queue 120 of processor card 106, it can be determined whether control plane queue 120 is experiencing sustained congestion caused by incoming control plane messages 126. Note that the sustained congestion determination can be implemented in diverse ways.

For example, the sustained congestion determination can include tracking the number of overflow indications of queue 120 over a define time threshold or period to determine if an overflow or congestion condition can be categorized as sustained or "bursty." Specifically, if it is determined that queue 120 is full, incoming control plane messages (e.g., 126 and/or 128) can be restricted from being input into queue 120. This restriction can be implemented in a wide variety of ways. For example, communication hardware 118 of the processor card (or control card) 106 can be directed to block the flow of control plane messages into queue 120. Once the incoming control plane messages are blocked, then one or more of the control plane messages in queue 120 can be dispatched to the appropriate control applications to achieve a predefined threshold level for queue 120. Once a particular amount of control plane messages have been removed from queue 120, incoming control plane messages can be allowed to be input into queue 120. Once it is determined that queue 120 is full again, this process can be repeated. Therefore, if queue 120 is filled a defined number of times over a defined time period or time threshold, its congestion can be categorized as sustained. It is understood that bursty congestion can be characterized by its more temporary nature while sustained congestion can be characterized by its more prolonged or drawn out nature. Note that the sustained congestion determination can be triggered automatically or manually (e.g., a person issuing a command to router 100).

Within FIG. 1, if the congestion caused by source 112 is determined to be sustained, the message headers (or copies thereof) can be extracted from the control plane messages 126 resident to queue 120 and stored (e.g., within table or list 122). Alternatively, the message headers (or copies thereof) can be extracted and stored (e.g., within table or list 122) for a predefined period or threshold of time. In another embodiment, any portion (or copy thereof) of control plane messages 126 that includes source ID information can be extracted and stored (e.g., within table or list 122). In yet another embodiment, the control plane messages 126 (or copies thereof) resident to the queue 120 can be extracted and stored (e.g., within table or list 122). Note that any of these extraction and storage operations can continuously occur before or concurrently with the sustained congestion determination, described herein. Therefore, each control plane message (e.g., 126 or 128) or any portion thereof can be continuously extracted and stored during normal operations of the processor card 106. It is appreciated that any extracted message data can be stored in a table 122, a list, or any other type of data store or data structure. Alternatively, any extracted message data can be stored by a first-in-first-out (FIFO) type of storage (not shown). As such, once the FIFO storage has reached capacity, as newer information is stored by the FIFO storage, older information can be discarded or "pushed out" of the FIFO storage.

The stored source ID (e.g., within table 122) can then be utilized to determine the potential source (or sources) of the control plane congestion. Note that this operation can be implemented in a wide variety of ways. For example, the source ID of each stored messages 126 can be scanned to determine if a predefined threshold of the control plane messages 126 belong to a particular source (e.g., 112). If so, source 112 is the potential source of the control plane congestion. The predefined threshold can be defined in diverse ways. For instance, the predefined threshold can be any predefined percent of the stored message items that corresponds to a specific source (e.g., 112). Given multiple sources 108, 110, and 112, the source or sources having a message count greater than and/or equal to a threshold value can be identified as the source (or sources) of the congestion.

For example, the threshold value could be 25% of the list of message entries in table 122. As such, there could potentially be four different sources (e.g., 108, 110, and 112) that concurrently meet the threshold hold value. Alternatively, the source ID and the channel used by each source can be utilized to identify the potential congestion source (or sources) of the control plane. Depending on how well the traffic going through router 100 is understood, the present embodiment can be modified to identify which source (or sources) is causing the control plane queue congestion.

Within FIG. 1, once the congestion source (e.g., 112) or sources are identified, a correction phase (or mode) can be entered in order to respond to the congestion or overflow condition. The correction phase (or mode) can be implemented in a wide variety of ways. For example, an alert or alarm can be issued or output to notify one or more operators of the router 100 about potential congestion source 112. The alarming or alerting functionality can include any and all types of alarms or alerts. For example, the alarm or alert can include, but is not limited to, visual techniques, audio techniques, display commands on the node, messaging techniques, and/or any other type of alarm. The correction phase or mode can include directing (e.g., via a transmitted command) the potential congestion source 112 to shut itself down (e.g., in an orderly manner). Alternatively, the correction mode or phase can include shutting down the local control port of the processor card 106 utilized by the potential congestion source 112. As such, the control plane messages 126 output by congestion source 112 are physically rejected such that they are not queued into control plane queue 120. The local control port shutdown may be initiated when there is no way to remotely shutdown the congestion source 112 or when the issued shutdown command to source 112 has timed out. It is understood that any combination of the different implementations of the correction phase, described herein, are in accordance with embodiments of the invention.

Within some embodiments of the invention, network router 100 can include a flexible way to categorize, alert, and shutdown one or more control plane flooding sources (e.g., 108, 110, and/or 112) that may otherwise cripple the operation of router 100 if not shutdown.

Network router 100 includes line cards 102 and 104. Note that router 100 can include a greater or lesser number of line cards than those shown. Note that line cards 102 and 104 are representative of any electronic hardware modules that can access the control plane. As such, the functionality associated with line cards 102 and 104 may be implemented by one or more electronic hardware modules that can access the control plane. Line card 102 includes source 108 that can be implemented with software, or hardware, or firmware, or any combination thereof. The line card 102 includes communication hardware 114 that enables it to communicate with communication hardware 118 of processor card 106. Additionally, source 108 is coupled with communication hardware 114 that enables it to transmit control plane messages 128 to communication hardware 118 of processor card 106. The line card 104 includes sources 110 and 112 that can each be implemented by software, by hardware, by firmware, or by any combination thereof. Moreover, line card 104 includes communication hardware 116 that enables it to communicate with communication hardware 118 of processor card 106. Furthermore, sources 110 and 112 are coupled with communication hardware 114 that enables each to transmit control plane messages 126 to communication hardware 118 of processor card 106. The processor card 106 includes control plane queue 120 that is coupled with communication hardware 118 and table 122. As such, control plane messages (e.g., 126 and 128) can be received by communication hardware 118 and input into control plane queue 120. At an appropriate time, data (or copies thereof) associated with control plane messages can be output or transmitted for storage in table (or list) 122.

Within FIG. 1, note the functionality described herein with reference to network router 100 can be implemented by, but is not limited to, software, hardware, firmware, or by any combination thereof.

Figure 2:
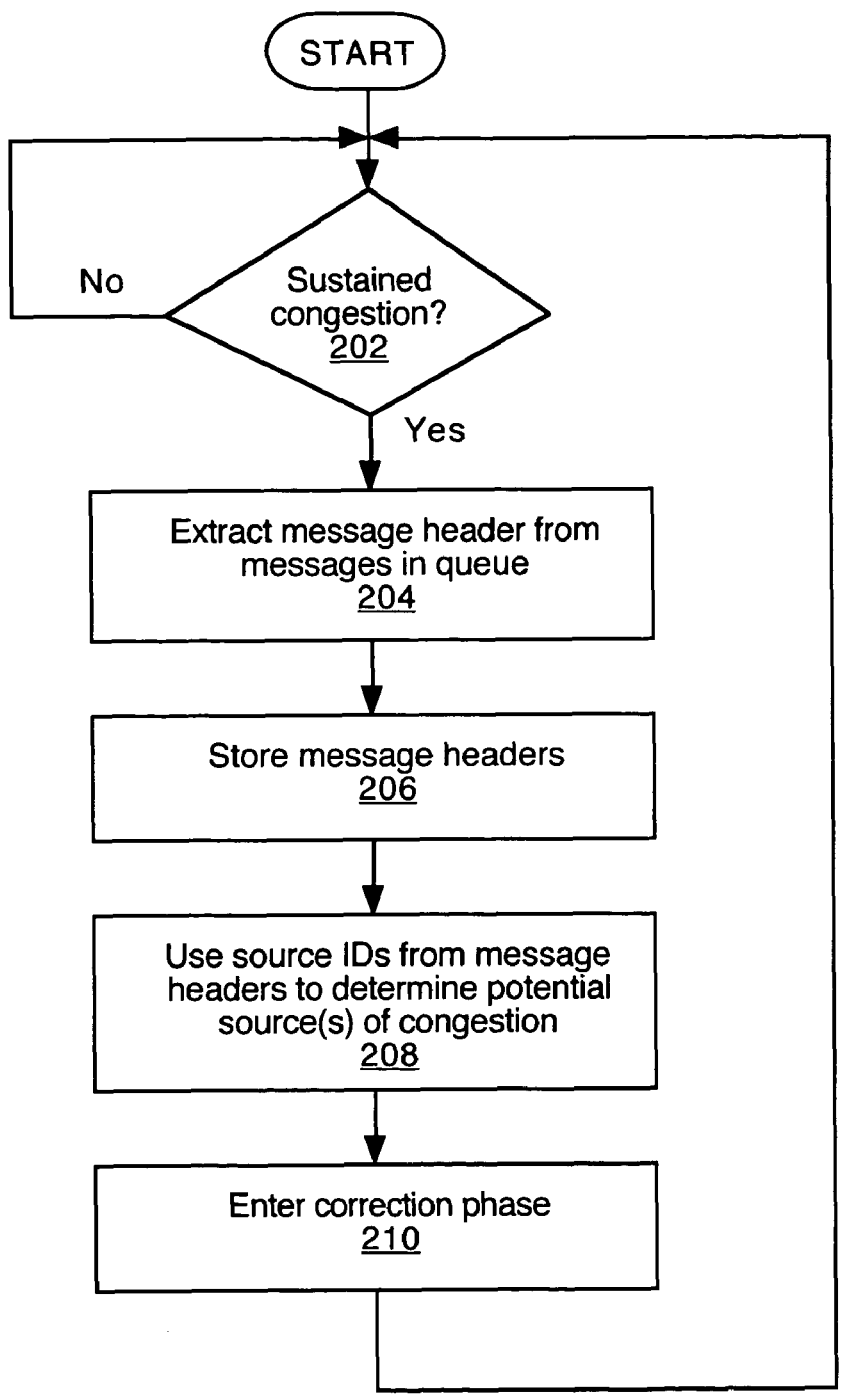
FIG. 2 is a flowchart of a method in accordance with embodiments of the invention for handling control plane congestion within a network router (or switch).

FIG. 2 is a flowchart of a method 200 in accordance with embodiments of the invention for handling control plane congestion within a router (or switch). Method 200 includes exemplary processes of embodiments of the invention which can be carried out by a processor(s) and electrical components under the control of electronic device readable and executable instructions (or code), e.g., software. The electronic device readable and executable instructions (or code) may reside, for example, in data storage features such as volatile memory, non-volatile memory and/or mass data storage that are usable by an electronic device. However, the electronic device readable and executable instructions (or code) may reside in any type of electronic device readable medium. Although specific operations are disclosed in method 200, such operations are exemplary. That is, method 200 may not include all of the operations illustrated by FIG. 2. Alternatively, method 200 may include various other operations and/or variations of the operations shown by FIG.

2. It is noted that the operations of method 200 can each be performed by software, by firmware, by hardware or by any combination thereof.

Specifically, a determination is made as to whether a processor card of a network router (or switch) is experiencing sustained congestion caused by control plane messages. If not, method 200 returns to repeat the sustained congestion determination. However, if the processor card is experiencing sustained congestion, the message headers are extracted from the messages that are currently in the queue. Once the message headers are extracted, they are then stored for subsequent use. The source ID contained by the message headers can be utilized to determine (or identify) the potential source or sources of the control plane congestion. A correction phase (or mode) is entered in order to respond to the control plane congestion. Therefore, method 200 can provide, but is not limited to, a flexible way to categorize, alert and shutdown one or more control plane flooding sources that may otherwise cripple the router (or switch) if not shutdown.

At operation 202 of FIG. 2, a determination is made as to whether one or more control plane queues of a control card or processor card of a network router (or switch) are experiencing sustained congestion caused by incoming control plane messages. If not, method 200 proceeds to the beginning of operation 202 in order to repeat the sustained congestion determination. However, if it is determined at operation 202 that the control plane queues of the processor card are experiencing sustained congestion, method 200 proceeds to operation 204. Note that operation 202 can be implemented in a wide variety of ways. For example, operation 202 can be implemented in a manner similar to method 300 described herein with reference to FIG. 3, but is not limited to such. In another embodiment, operation 202 can be implemented in a manner similar to method 400 described herein with reference to FIG. 4, but is not limited to such. Alternatively, operation 202 can be implemented such that it tracks the number of overflow indications of the queues over a time threshold to determine if an overflow condition can be categorized as "sustained". In other embodiments, operation 202 can be implemented in an automatic manner or it can be manually implemented such as, a person utilizing an input device to issue a command to the router or switch.

At operation 204, the message headers (or copies thereof) can be extracted from the control plane messages that are currently resident to the queue or queues of the control card. It is appreciated that operation 204 can be implemented in diverse ways. For example, operation 204 can be implemented such that the message header (or copies thereof) can be extracted for a predefined period or threshold of time. Furthermore, operation 204 can be implemented such that any portion (or copies thereof) can be extracted from the control plane messages that are resident to the queue. For example, the source ID (or a copy thereof) associated with each control plane message resident to the queue can be extracted at operation 204. Alternatively, the control plane messages (or copies thereof) resident to the queue can be extracted at operation 204. In another embodiment, operation 204 can be implemented such that any portion (or copies thereof) can be extracted from a sampling of the control plane messages that are resident to the queue. In yet another embodiment, operation 204 can be implemented such that any portion (or copies thereof) can be extracted from a certain number of the control plane messages that are resident to the queue. In other embodiments, operation 204 can continuously occur before or concurrently with operation 202. As such, each control plane message or any portion of it can be continuously extracted during normal operations of the processor card or control card.

At operation 206 of FIG. 2, the extracted message headers (for example) can be stored for subsequent use. Note that operation 206 can be implemented in a wide variety of ways. For example, operation 206 can be implemented to store anything that is extracted from the control plane queues at operation 204, as described herein. Alternatively, operation 206 can be implemented to store anything extracted at operation 204 in a table, a list, or any other type of data store or data structure. In another embodiments, operation 206 can be implemented to store anything extracted at operation 204 in a FIFO type of storage. Therefore, as newer information is stored by the FIFO storage at operation 206, older information can be discarded or pushed out of the FIFO storage once it is filled to capacity. Note that according to some embodiments, operations 204 and 206 can also be implemented to occur before or concurrently with operation 202.

At operation 208, the source ID contained by the message headers can be utilized to determine the potential source (or sources) of the control plane congestion. Note that operation 208 can be implemented in diverse ways. For example, at operation 208, the source ID of each stored message item can be parsed and tallied to determine which source has the greatest number of control plane messages associated with it. As such, the source(s) with the highest number can be identified as the potential source(s). Alternatively, at operation 208, the source ID of each stored message items (e.g., in a table or list or data store) can be scanned to determine if a predefined threshold (e.g., 50% of list or table items) of the control plane messages belong to a particular source. If so, that particular source is the potential source of the congestion. Note that the predefined threshold can be defined in a wide variety of ways. For instance, the predefined threshold can be any predefined percent of the stored message items (e.g., in a list or table) belonging to a specific source. Given multiple sources, at operation 208 the source or sources having a message count greater than and/or equal to a defined threshold value can be determined to be the source (or sources) of the congestion. For example, the threshold value at operation 208 could be 30% of the list of message entries. Therefore, potentially there could be three different sources that concurrently could be over the threshold hold value. Alternatively, at operation 208, the source ID and the channel being used by each source can be utilized to determine the potential congestion source (or sources) of the control plane. Note that depending on how well the traffic going through the router or switch is understood, operation 208 can be modified to determine with source (or sources) is causing the congestion of the control plane queue.

At operation 210 of FIG. 2, a correction phase (or mode) can be entered that can utilize the identity of the potential source(s) of the control plane congestion. Operation 210 can be implemented in a wide variety of ways. For example, at operation 210, an alarm can be issued thereby notifying one or more operates of the router (or switch) of the potential source(s) of the control plane congestion. Note that the alarming function can be implemented to include any and all types of alarms. For example, the alarm can include, but is not limited to, visual audio, display commands on the node, messaging, and/or any other type of output that can be utilized by the router or switch. Alternatively, at operation 210, the potential congestion source can be directed (via a transmitted command) to shut itself down (e.g., in an orderly manner). In other embodiments, at operation 210, the specific control port local to the control card (or processor card) that is being utilized by the potential congestion source can be shutdown. In this manner, the control plane messages output by the congestion source are physically rejected at operation 210 so that they are not queued into the common control plane queue. Note that the local shutdown at operation 210 can be implemented if there is no way to remotely shutdown the source or if the transmitted shutdown command to the source times out. It is understood the implementations of operation 210, described herein, and any combination thereof are in accordance with embodiments of the invention. Once operation 210 has been completed, process 200 proceeds to the beginning of operation 202.

Note that in other embodiments, operations 204, 206, and 208 can continuously occur before or concurrently with operation 202. Operation 208 can be implemented to parse and tally the source ID of each stored message item on-the-fly. Additionally, operation 208 can be implemented to determine (or identify) the potential source(s) of the congestion once operation 202 is answered in the affirmative. Furthermore, operation 206 can be implemented to store results of operation 208 at different time periods or events along with that the stored message items. Therefore, the stored message items and results of operation 208 can later be compared, authenticated, and/or validated.

Within FIG. 2, it is understood that operations 204 and 208 can continuously occur before or concurrently with operation 202 in accordance with embodiments of the invention. Operation 208 can be implemented to parse and tally the source ID of each message item on-the-fly. Additionally, operation 208 can be implemented to determine (or identify) the potential source(s) of the congestion once operation 202 is answered in the affirmative.

Figure 3:
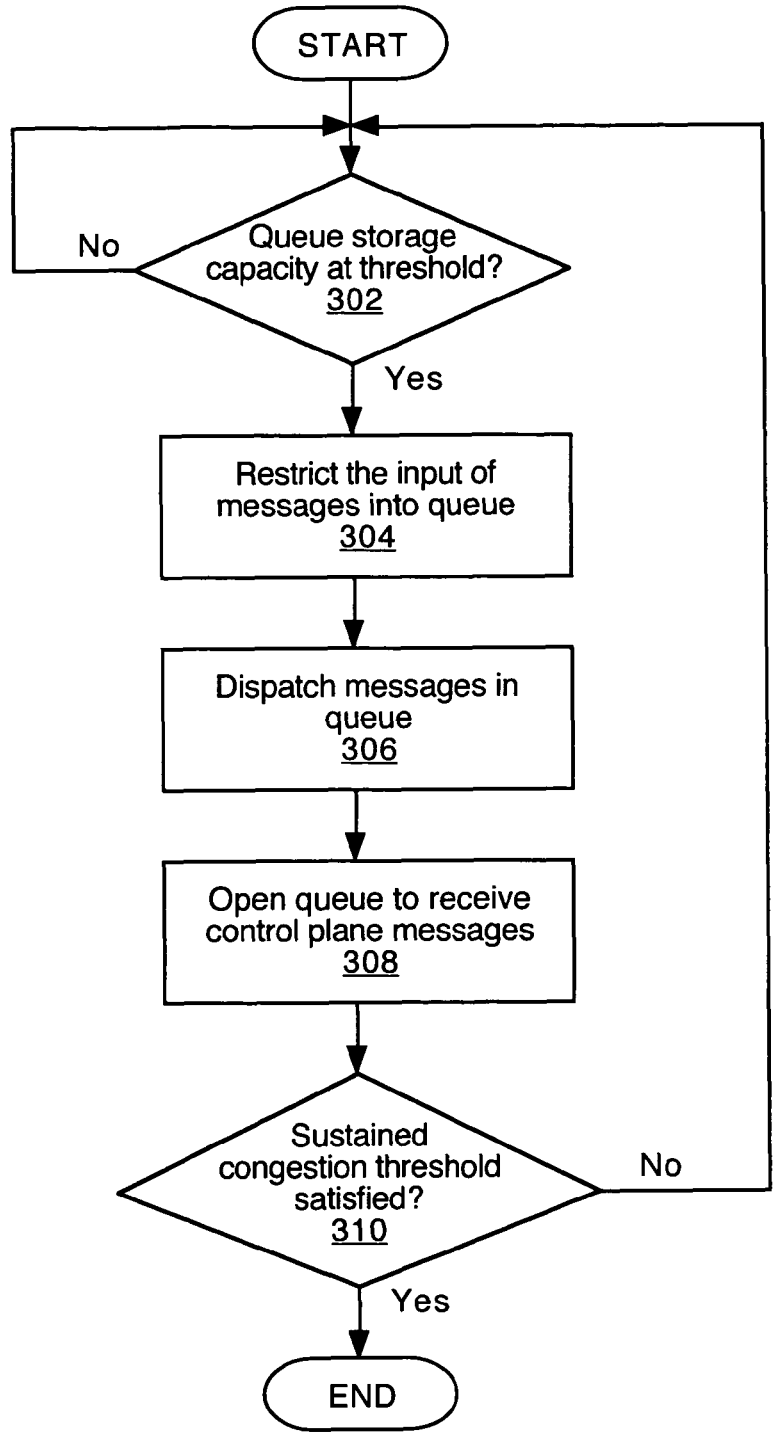
FIG. 3 is a flowchart of a method in accordance with embodiments of the invention for determining whether a network router (or switch) is experiencing sustained control plane congestion.

FIG. 3 is a flowchart of a method 300 in accordance with embodiments of the invention for determining whether a network router (or switch) is experiencing sustained control plane congestion. Method 300 includes exemplary processes of embodiments of the invention which can be carried out by a processor(s) and electrical components under the control of electronic device readable and executable instructions (or code), e.g., software. The electronic device readable and executable instructions (or code) may reside, for example, in data storage features such as volatile memory, non-volatile memory and/or mass data storage that are usable by an electronic device. However, the electronic device readable and executable instructions (or code) may reside in any type of electronic device readable medium. Although specific operations are disclosed in method 300, such operations are exemplary. That is, method 300 may not include all of the operations illustrated by FIG. 3. Alternatively, method 300 may include various other operations and/or variations of the operations shown by FIG. 3. It is noted that the operations of method 300 can each be performed by software, by firmware, by hardware or by any combination thereof.

Specifically, a determination is made as to whether the queue (or queues) of a processor card of a network router (or switch) has met a "congestion" threshold of control plane messages. If not, method 300 returns to repeat the "congestion" threshold determination. However, if it is determined that the queue of the processor card has reached the congestion threshold, the queue can be restricted (or barred) from accepting any more control plane messages. Then the control plane messages in the queue can be dispatched to the appropriate control applications. Next, the processor card queue can be opened for reception of control plane messages. A determination can be made as to whether a "sustained" congestion threshold has been satisfied. If not, method 300 returns to repeat the congestion threshold determination.

However, if the sustained congestion threshold has been satisfied, method 300 is exited. Note that method 300 can be utilized for implementing operation 202 of FIG. 2, but is not limited to such.

At operation 302 of FIG. 3, a determination is made as to whether the queue or queues (e.g., 120) of a processor card or control card (e.g., 106) of a network router or switch (e.g., 100) has met a predefined "congestion" threshold of control plane messages. If not, process 300 proceeds to the beginning of operation 302 to repeat the "congestion" threshold determination. However, if it is determined at operation 302 that the queue of the processor card has met the "congestion" threshold, method 300 proceeds to operation 304. Note that operation 302 can be implemented in a wide variety of ways. For example, the predefined congestion threshold can be met at operation 302 when the storage capacity of the queue (or queues) is full. Alternatively, the predefined congestion threshold can be met at operation 302 when the storage capacity of the queue (or queues) reaches a defined percentage value. In another embodiment, the predefined congestion threshold can be met at operation 302 when the queue (or queues) includes a defined number of control plane messages. It is understood that the predefined congestion threshold is not limited to these mentioned embodiments.

At operation 304, the processor card queue(s) is restricted (or blocked) from receiving any further control plane messages from any sources. Note that by restricting the input of control plane messages into the processor card queue(s), every incoming message from a source is being discarded or dumped. It is understood that operation 304 can be implemented in a wide variety of ways. For example, communication hardware (e.g., 118) of the processor card (or control card) can be directed to stop the flow of control plane messages into the processor card queue(s).

At operation 306 of FIG. 3, one or more of the control plane messages currently resident to the processor card queue (or queues) can be dispatched to the appropriate control applications. It is noted that operation 306 can be implemented in a wide variety of ways. For example, one or more of the control plane messages currently resident to the processor card queue can be dispatched to the appropriate control applications to satisfy a predefined "dispatch" threshold level associated with the storage capacity of the control plane queue. In another embodiment, the control plane messages currently resident to the processor card queue can be dispatched in order to clear out or empty the control plane queue or queues of the processor card (or control card).

At operation 308, the control plane queue (or queues) of the processor card (or control card) is open thereby enabling it to receive more control plane messages from one or more application sources. Note that operation 308 can be implemented in diverse ways. For example, communication hardware (e.g., 118) of the processor card (or control card) can be directed to allow the flow of control plane messages into the processor card queue(s) from one or more application sources. In this manner, incoming control plane messages are allowed at operation 308 to be input into the control plane queue (or queues) of the processor card (or control card).

At operation 310 of FIG. 3, a determination is made as to whether a predefined "sustained" congestion threshold has been satisfied (or met). If not, method 300 proceeds to the beginning of operation 302. However, if the predefined sustained congestion threshold has been satisfied, method 300 is exited. It is understood that operation 310 can be implemented in a wide variety of ways. For example, the predefined sustained congestion threshold can be satisfied at operation 310 when operations 302, 304, 306, and 308 are repeated a certain number of times in a predefined time period. If so, it can be determined at operation 310 that the control plane congestion is sustained. Note that if the control plane congestion is not sustained at operation 310, it may be considered "bursty" since the congestion is more temporary in nature.

It is noted that operations 204 and 206 of FIG. 2 can be implemented after operation 304 and before operation 306 of FIG. 3 in accordance with embodiments of the invention. As such, if method 300 is utilized for implementing operation 202 of FIG. 2, operations 204 and 206 of FIG. 2 may not be performed once operation 202 is answered in the affirmative. Note that operation 206 can be implemented to store anything extracted at operation 204 in a table, a list, or any other type of data store or data structure that can be organized by time, a particular event, or a particular trigger (e.g., first congestion indication, second congestion indication, and the like).

Figure 4:
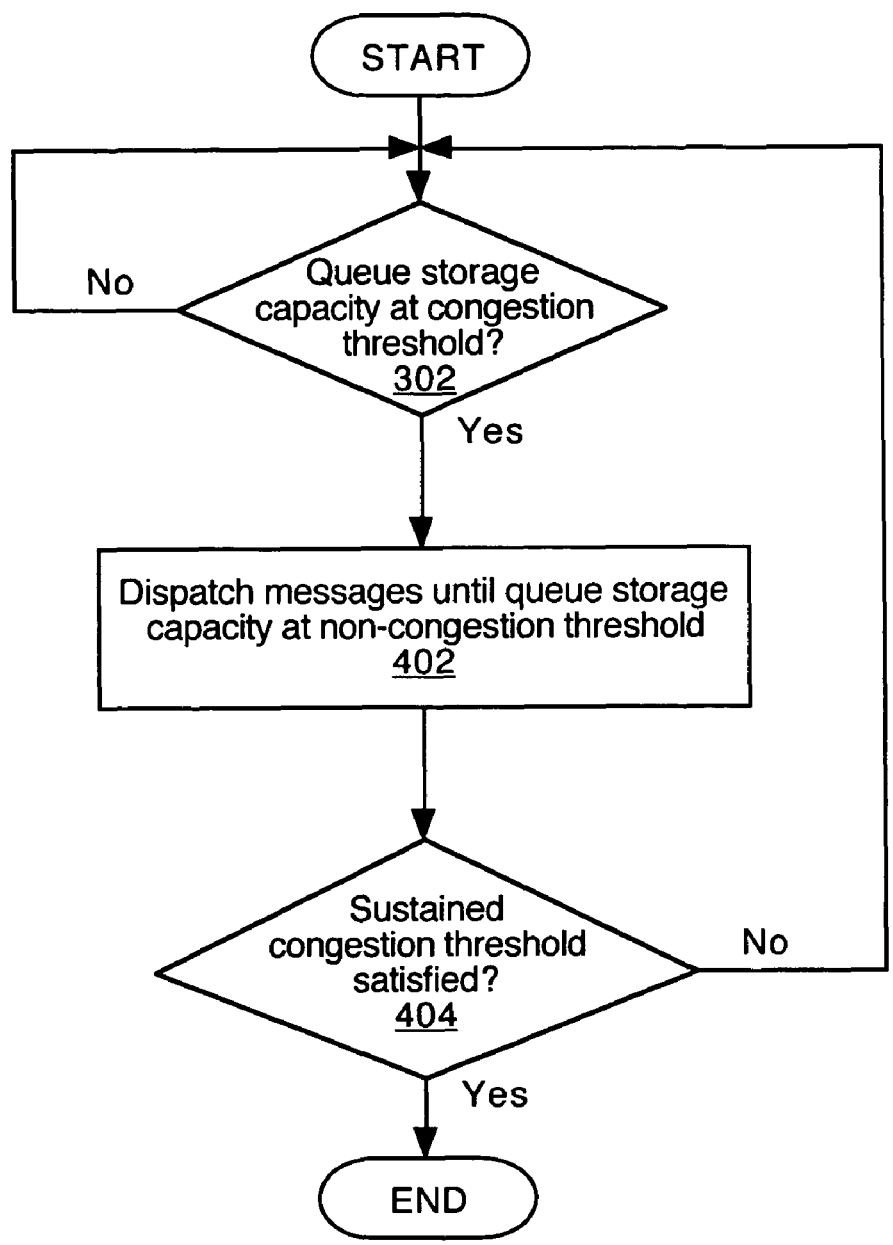
FIG. 4 is a flowchart of another method in accordance with embodiments of the invention for determining whether a network router (or switch) is experiencing sustained control plane congestion.

FIG. 4 is a flowchart of a method 400 in accordance with embodiments of the invention for determining whether a network router (or switch) is experiencing sustained control plane congestion. Method 400 includes exemplary processes of embodiments of the invention which can be carried out by a processor(s) and electrical components under the control of electronic device readable and executable instructions (or code), e.g., software. The electronic device readable and executable instructions (or code) may reside, for example, in data storage features such as volatile memory, non-volatile memory and/or mass data storage that are usable by an electronic device. However, the electronic device readable and executable instructions (or code) may reside in any type of electronic device readable medium. Although specific operations are disclosed in method 400, such operations are exemplary. That is, method 400 may not include all of the operations illustrated by FIG. 4. Alternatively, method 400 may include various other operations and/or variations of the operations shown by FIG. 4. It is noted that the operations of method 400 can each be performed by software, by firmware, by hardware or by any combination thereof.

Specifically, a determination is made as to whether the queue (or queues) of a processor card of a network router (or switch) has met a predefined "congestion" threshold of control plane messages. If not, method 400 returns to repeat the "congestion" threshold determination. However, if it is determined that the queue of the processor card has reached the congestion threshold, the control plane messages in the queue can be dispatched to satisfy a predefined "dispatch" threshold level associated with the queue. A determination can be made as to whether a "sustained" congestion threshold has been satisfied. If not, method 400 returns to repeat the congestion threshold determination. However, if the sustained congestion threshold has been satisfied, method 400 is exited. Note that method 400 can be utilized for implementing operation 202 of FIG. 2, but is not limited to such.

It is appreciated that operation 302 of FIG. 4 can be implemented in a manner similar to operation 302 of FIG. 3, as described herein.

At operation 402 of FIG. 4, one or more of the control plane messages currently resident to the processor card queue or queues (e.g., 120) can be dispatched to the appropriate control applications to satisfy a predefined "dispatch" threshold level associated with the control plane queue. Note that the processor card queue (or queues) can still be receiving incoming control plane messages at operation 402. As such, the dispatching of the control plane messages from the queue (or queues) at operation 402 may have to be faster than the reception by the queue (or queues) of incoming control plane messages. If not, process 300 of FIG. 3 may be utilized instead of process 400.

It is noted that operation 402 can be implemented in a wide variety of ways. For example, the predefined dispatch threshold can be met at operation 402 when the queue (or queues) is emptied. Alternatively, the predefined dispatch threshold can be met at operation 402 upon reaching a predefined storage capacity percentage value of the queue (or queues). In another embodiment, the predefined dispatch threshold can be met at operation 402 when the queue (or queues) includes a predefined number of control plane messages. It is understood that the predefined dispatch threshold is not limited to these mentioned embodiments.

At operation 404 of FIG. 4, a determination can be made as to whether a "sustained" congestion threshold has been satisfied (or met). If not, method 400 proceeds to the beginning of operation 302 to repeat the congestion threshold determination. However, if the sustained congestion threshold has been satisfied, method 400 is exited. It is understood that operation 404 can be implemented in a wide variety of ways. For example, the predefined sustained congestion threshold can be satisfied at operation 404 if operations 302 and 402 of FIG. 4 are repeated a certain number of times in a predefined time period. If so, it can be determined at operation 404 that the control plane congestion is sustained. Note that if the control plane congestion is not sustained at operation 404, it may be considered "bursty" since the congestion is more temporary in nature.

It is noted that operations 204 and 206 of FIG. 2 can be implemented after operation 302 of FIG. 4 and before operation 402 in accordance with embodiments of the invention. Therefore, if method 400 is utilized for implementing operation 202 of FIG. 2, operations 204 and 206 of FIG. 2 may not be performed once operation 202 is answered in the affirmative. Note that operation 206 can be implemented to store anything extracted at operation 204 in a table, a list, or any other type of data store or data structure that can be organized by time, a particular event, or a particular trigger (e.g., first congestion indication, second congestion indication, and the like).

Figure 5:
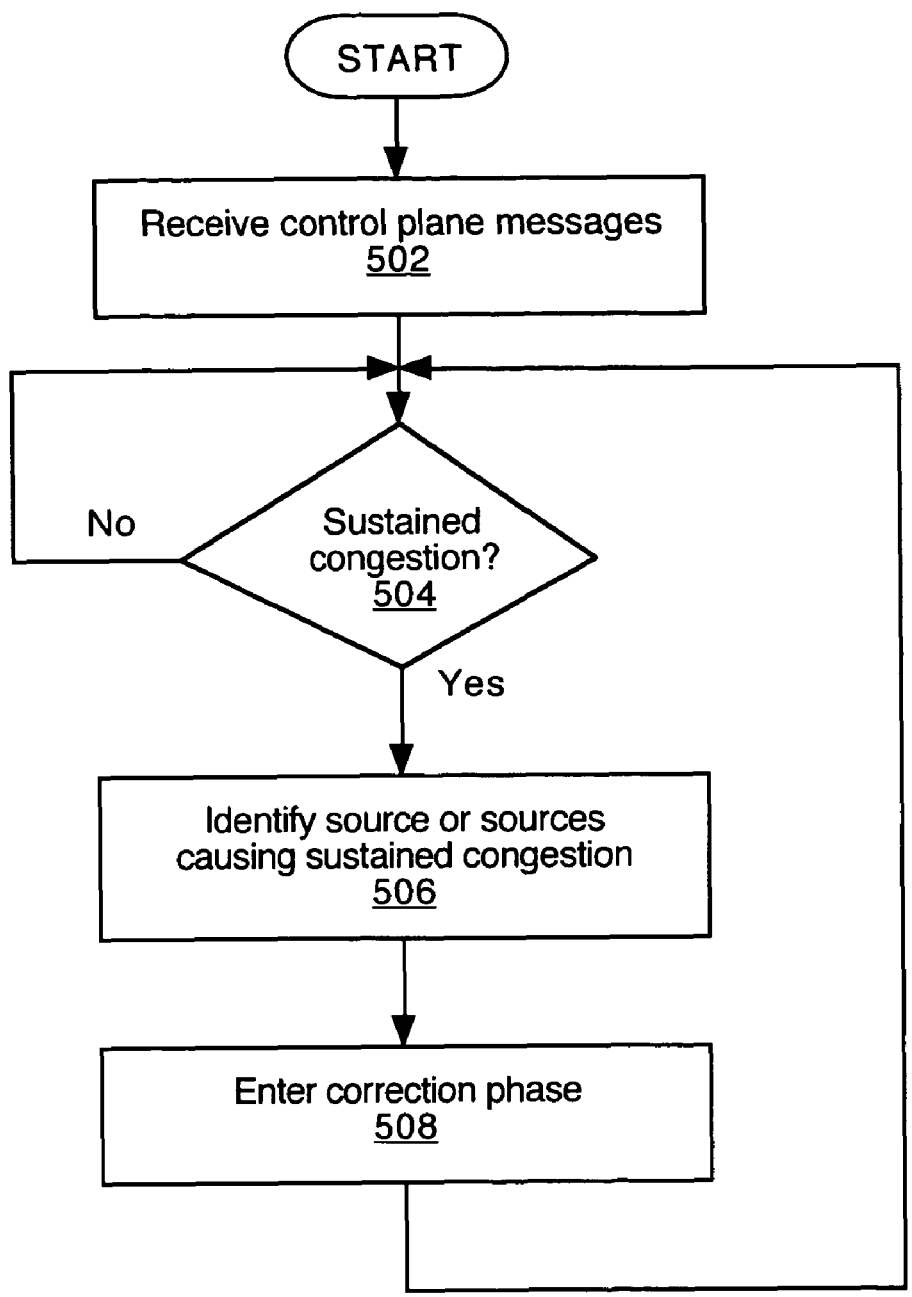
FIG. 5 is a flowchart of a method in accordance with embodiments of the invention for handling control plane congestion.

FIG. 5 is a flowchart of a method 500 in accordance with embodiments of the invention for handling control plane congestion. Method 500 includes exemplary processes of embodiments of the invention which can be carried out by a processor(s) and electrical components under the control of electronic device readable and executable instructions (or code), e.g., software. The electronic device readable and executable instructions (or code) may reside, for example, in data storage features such as volatile memory, non-volatile memory and/or mass data storage that are usable by an electronic device. However, the electronic device readable and executable instructions (or code) may reside in any type of electronic device readable medium. Although specific operations are disclosed in method 500, such operations are exemplary. That is, method 500 may not include all of the operations illustrated by FIG. 5. Alternatively, method 500 may include various other operations and/or variations of the operations shown by FIG. 5. It is noted that the operations of method 500 can each be performed by software, by firmware, by hardware or by any combination thereof.

Specifically, a plurality of control plane messages are received by some type of electronic apparatus or device. A determination is made as to whether the electronic apparatus is experiencing sustained congestion caused by the control plane messages. If not, method 500 returns to repeat the sustained congestion determination. However, if the electronic apparatus is experiencing sustained congestion, the source (or sources) can be identified that is causing the sustained congestion condition. Once the source is identified, a correction phase or mode can be entered in order to respond to the control plane congestion.

At operation 502 of FIG. 5, multiple control plane messages are received by an electronic apparatus or device. Note that operation 502 can be implemented in a wide variety of ways. For example, the electronic apparatus can be implemented as, but is not limited to, a processor card or control card (e.g., 106) of a router or switch (e.g., 100), a line card (e.g., 102 or 104) of a router or switch, a route processor card of a router or switch, any type of electronic hardware module having access to a control plane. Additionally, the control plane messages can be implemented in any manner similar to that described herein, but are not limited to such. Note that operation 502 may occur concurrently with operations 504, 506, and 508, but is not limited to such.

At operation 504, a determination is made as to whether the electronic apparatus is experiencing sustained congestion caused by the incoming control plane messages. If not, method 500 proceeds to the beginning of operation 504 to repeat the sustained congestion determination. However, if it is determined at operation 504 that the electronic apparatus is experiencing sustained congestion, method 500 proceeds to operation 506. Note that operation 504 can be implemented in a wide variety of ways. For example, operation 504 can be implemented in a manner similar to methods 300 described herein with reference to FIG. 3, but is not limited to such. In another embodiment, operation 504 can be implemented in a manner similar to method 400 described herein with reference to FIG. 4, but is not limited to such. Alternatively, operation 504 can be implemented such that it tracks the number of overflow indications of a queue (or queues) over a time threshold to determine if an overflow condition can be categorized as "sustained". In other embodiments, operation 504 can be implemented in an automatic manner or it can be manually implemented such as, a person utilizing an input device to issue a command to the router or switch.

At operation 506 of FIG. 5, the source (or sources) can be identified that is causing the sustained congestion condition of the electronic apparatus. It is understood that the identified source(s) at operation 506 can be referred to as a potential source(s). Note that operation 506 can be implemented in diverse ways. For example, operation 506 may be implemented to include any functionality described herein associated with identifying the source (or sources) of control plane congestion, but is not limited to such.

At operation 508, a correction phase (or mode) can be entered to respond to the identified source (or sources) of the sustained congestion. It is appreciated that operation 508 can be implemented in a wide variety of ways. For example, operation 508 can be implemented in any manner similar to that described herein with reference to a correction phase (or mode), but is not limited to such. Once operation 508 has been completed, process 500 proceeds to the beginning of operation 504.

Note that embodiments in accordance with the invention can be formed by any combination of methods 200, 300, 400, and 500.

Figure 6:
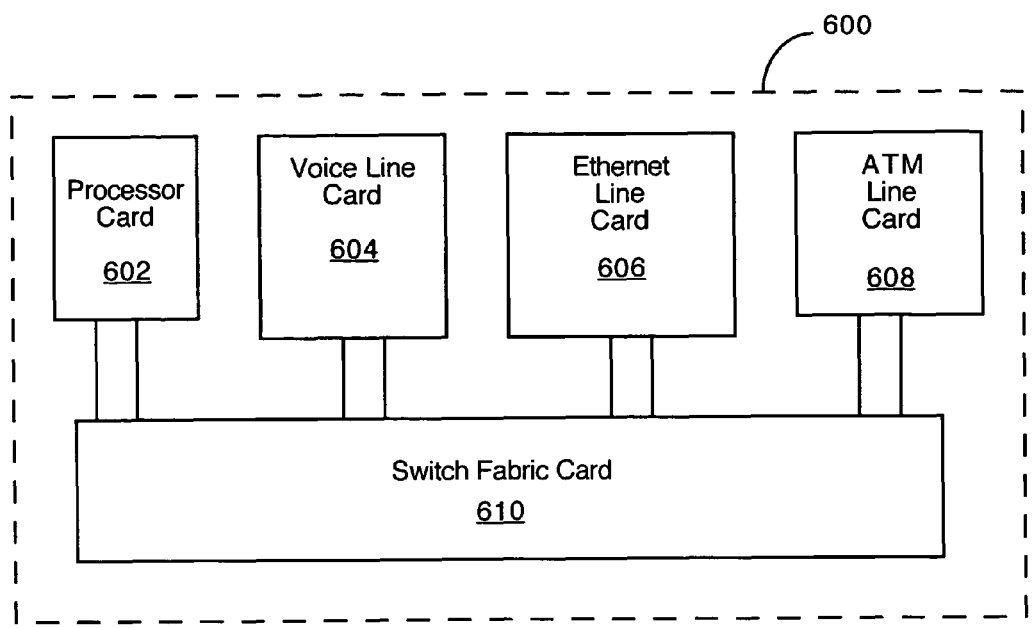
FIG. 6 is a block diagram of an exemplary network communication switch (or router) that may be used in accordance with embodiments of the invention.

FIG. 6 is a block diagram of an exemplary network communication switch (or router) 600 that may be used in accordance with embodiments of the invention. Within the discussions of embodiments in accordance with the invention herein, certain processes and operations were discussed that may be realized, in some embodiments, as a series of instructions or code (e.g., software program) that may reside within readable memory of switch 600 and executed by a processor(s) of switch 600. When executed, the instructions (or code) may cause one or more components of switch 600 to perform specific operations and exhibit specific behavior which are described herein. Note that any network switch or router (e.g., 100) mentioned herein with reference to FIGS. 1, 2, 3, 4, and 5 can be implemented in a manner similar to switch (or router) 600.

Network switch (or router) 600 includes one or more switch fabric cards (and/or buses) 610 for communicating information, one or more processor cards 602 coupled with switch fabric card(s) 610 for, but not limited to, making centralized decisions related to line cards 604, 606, and 608, along with what to enable, how signals should be driven, and the like. Processor card(s) 602 may include one or more microprocessors or any other type of processor. The switch 600 may also include, but is not limited to, one or more voice line cards 604, one or more Ethernet line cards 604, and one or more Asynchronous Transfer Mode (ATM) line cards 608 coupled with switch fabric card(s) 610 for forwarding data and information between different computers and/or networks. Each voice line card 604 can be implemented in a wide variety of ways. For example, a voice line card 604 can be implemented as, but is not limited to, a time-division multiplexing (TDM) card that can include one or more digital signal processors (DSPs), any type of voice circuit card, and the like. Note that network switch (or router) 600 can be implemented with redundant processor cards (e.g., 602) and line cards for those cards (e.g., 604, 606, and 608) shown. Furthermore, network switch 600 can include any type and any number of cards, line cards, and/or processor cards.

It is noted that some embodiments in accordance with the invention have been described herein with reference to a processor card or a control card. However, embodiments in accordance with the invention are not limited to such. Instead, embodiments in accordance with the invention can operate with any type of electronic hardware module or modules that use a control plane.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
   receiving one or more control plane messages for storage in a queue;
   executing an operation responsive to an overflow condition,
   wherein the overflow condition is associated with exceeding a storage capacity of the queue;
   wherein the operation is inferred to be an overflow indication;
   tracking a number of overflow indications over a predetermined time period;
   comparing the number of overflow indications to a pre-set threshold number of overflow indications;
   determining the queue is experiencing sustained congestion based on the comparison, wherein when a number of overflow conditions exceeds the pre-set threshold number of overflow indications for the predetermined time period, the congestion is determined to be sustained;

identifying a source of said sustained congestion wherein identifying the source comprises:
extracting message headers from the one or more control plane messages in the queue wherein each message header includes source identification information;
storing the message headers in a table;
inspecting the message headers to identify one or more sources of the control plane messages in the queue; and
identifying a particular source identified either more than other sources in the table or identified in at least a threshold percentage of the message headers in the table as the source of the sustained congestion; and
entering a correction phase to respond to said source of said sustained congestion.

2. The method as described in claim 1, wherein said correction phase comprises alerting of said source of said sustained congestion.

3. The method as described in claim 1, wherein said correction phase comprises directing said source to shutdown.

4. The method as described in claim 1, wherein:
said receiving control plane messages comprises utilizing a port of a processor card; and
said correction phase comprises shutting down said port.

5. The method as described in claim 1, wherein the one or more control plane messages each include source identification information to uniquely identify sources of the corresponding control plane messages, and wherein said identifying said source of said sustained congestion is based on said source identification information of the control plane messages stored in the queue.

6. The method as described in claim 5, wherein said identifying said source of said sustained congestion further comprises determining a predefined threshold of said control plane messages belong to a particular source by utilizing said source identification information of said control plane messages.

7. A system comprising:
a line card comprising a source for outputting a plurality of control plane messages; and
a processor card coupled with the line card, the processor card comprising at least one queue to store the plurality of control plane messages, wherein the processor card is configured to:
determine an overflow condition associated with the at least one queue;
respond to the overflow condition, wherein said response is an overflow indication;
track one or more overflow indications over a predetermined time period;
compare a number of overflow indications to a pre-set threshold number of overflow indications;
determine the one or more queues are experiencing sustained congestion based on the comparison;
extract a message header from each of the plurality of control plane messages, wherein each message header includes source identification information;
store extracted message headers in a table;
inspect the extracted message headers to identify one or more sources of the plurality of control plane messages in the at least one queue;
identify a source of said sustained congestion by inferring that the source of the sustained congestion is a particular source that is either indicated in the message headers more than all other sources indicated in the message headers or identified in at least a threshold percentage of the message headers; and
enter a correction phase to respond to said source of said sustained congestion.

8. The system of claim 7, wherein said system comprises a network communication router.

9. The system of claim 7, wherein said system comprises a network communication switch.

10. The system of claim 7, wherein said processor card is further configured to alert said source of said sustained congestion.

11. The system of claim 7, wherein said processor card is further configured to direct said source of said sustained congestion to shutdown.

12. The system of claim 7, wherein:
said processor card further comprises a port for receiving said plurality of control plane messages; and
wherein said processor card is further configured to shut down said port.

13. A computer-readable storage memory embodied with instructions executable by one or more processors, the instructions when executed by the one or more processors cause a computer to:
receive, a plurality of control plane messages, where the control plane messages are directed to a queue;
execute an overflow operation responsive to storing at least one of the control plane messages in the queues exceeding a storage capacity of the queue, wherein the operation is inferred to be an overflow indication;
track one or more overflow indications over a defined time period;
determine a processor card is experiencing sustained congestion based on the tracked overflow indications;
extract a message header from each of the plurality of control plane messages, wherein each message header includes source identification information;
store the message headers in a list;
tally sources identified in the message headers;
identify a source of said sustained congestion based on a comparison of the tallied sources; and
enter a correction phase to respond to said source of said sustained congestion.

14. The computer-readable storage memory embodied with instructions executable by one or more processors of claim 13, wherein the one or more processors further cause a computer to issue an alarm associated with said correction phase corresponding to said source of said sustained congestion.

15. The computer-readable storage memory embodied with instructions executable by one or more processors of claim 13, wherein the one or more processors further cause a computer to direct said source to shutdown, the directive issued in association with said correction phase.

16. The computer-readable storage memory embodied with instructions executable by one or more processors of claim 14, wherein the one or more processors further cause a computer to:
utilize a port of said processor card to receive said plurality control plane messages; and
shut down said port in association with said correction phase.

17. The computer-readable storage memory embodied with instructions executable by one or more processors of claim 13 wherein the one or more processors further cause a computer to:

sum message headers associated with each source identified; and infer that the source of the sustained congestion is a particular source that is associated with either a greatest sum of message headers or is associated with a sum of message headers exceeding a threshold percentage of total sum of message headers.

18. An apparatus comprising:
a processor card comprising at least one queue to store a plurality of control plane messages, wherein the processor card is configured to:
receive a plurality of control plane messages for storage in a queue;
execute an operation responsive to an overflow condition, wherein the overflow condition is associated with exceeding a storage capacity of the queue, wherein the operation is inferred to be an overflow indication;
detect the overflow indication;
determine the queue is experiencing congestion by tracking the overflow indications detected over a predetermined time period;
determine the congestion is prolonged congestion by comparing a number of tracked overflow indications to a predetermined threshold number;
identify a source of said prolonged congestion wherein identifying the source of said prolonged congestion comprises:
extract message headers from the one or more control plane messages in the queue wherein each message header includes source identification information;
store the message headers in a table;
inspect the message headers to identify one or more sources of the control plane messages in the queue; and
identify a particular source identified either more than other sources in the table or identified in at least a threshold percentage of the message headers in the table as the source of sustained congestion; and
enter a correction phase to respond to said source of said prolonged congestion.

19. The apparatus of claim 18, wherein said predetermined threshold number is greater than one.

20. The apparatus of claim 18, wherein said entering said correction phase comprises directing said source to shutdown.

21. The apparatus of claim 18, wherein:
one or more of said plurality of control plane messages comprises a source identification corresponding to its source; and
said identifying said source of said prolonged congestion comprises utilizing said source identification.

22. The apparatus of claim 21, wherein the processor card is further configured to: determine if a predefined threshold of said plurality of control plane messages belong to a particular source by utilizing said source identification of each of said plurality of control plane messages.

23. An apparatus comprising:
a control device comprising one or more ports for receiving a plurality of control plane messages, where the control device is configured to:
store the control plane messages in one or more queues;
identify an overflow indication when storing a newly received control plane message in at least one of the queues would exceed a storage capacity of that queue, wherein said overflow indication comprises an operation executed responsive to an overflow condition;
track the overflow indications that are issued over a predetermined period of time;
trigger a determination of whether any of the one or more queues is experiencing sustained congestion, where the determination is based at least in part on a threshold number of overflow indications over the predetermined period of time;
extract a message header from each of the plurality of control plane messages, wherein each message header includes source identification information;
store extracted message headers in a table;
inspect the extracted message headers to identify one or more sources of the plurality of control plane messages in the queue;
identify a source of the sustained congestion based on a tally of the identified one or more sources of the plurality of control plane messages and a comparison of the tallied sources; and
enter a correction phase to respond to the source of the sustained congestion.

24. The apparatus of claim 23, wherein the overflow indication comprises filling at least one of the one or more queues.

25. The apparatus of claim 23, wherein the control device is further operable to extract and store message headers from messages resident in the one or more queues experiencing sustained congestion and where the message headers are to be evaluated to identify the source of the sustained congestion.

26. The apparatus of claim 23, wherein the control device is further operable to identify which of the one or more ports for receiving the plurality of control plane messages is a local source of the sustained congestion.

27. The apparatus of claim 26, wherein during the correction phase the control device is further operable to direct the source to shutdown or direct the local source to shut down, or combinations thereof.

28. The apparatus of claim 23, wherein the control device is further operable to receive user input to trigger the determination of whether any of the one or more queues is experiencing sustained congestion.

29. The method as described in claim 1, wherein said determining said queue is experiencing said sustained congestion further comprises counting a number of overflow indications over the predetermined time period to determine that the number of overflow indications exceeds a threshold number.

* * * * *

UNITED STATES PATENT AND TRADEMARK OFFICE
CERTIFICATE OF CORRECTION

| | | |
|---|---|---|
| PATENT NO. | : 7,843,829 B1 | Page 1 of 1 |
| APPLICATION NO. | : 10/915779 | |
| DATED | : November 30, 2010 | |
| INVENTOR(S) | : Van Truong et al. | |

It is certified that error appears in the above-identified patent and that said Letters Patent is hereby corrected as shown below:

At column 16, line 28, please replace "queues" with --queue--.

Signed and Sealed this
Eleventh Day of October, 2011

David J. Kappos
*Director of the United States Patent and Trademark Office*